United States Patent [19]

Nakamura et al.

[11] Patent Number: 5,427,712
[45] Date of Patent: Jun. 27, 1995

[54] LIQUID CRYSTAL POLYMER COMPOSITION

[75] Inventors: Kiyokazu Nakamura; Noriaki Goto, both of Nagoya; Toshihide Inoue, Ichinomiya, all of Japan

[73] Assignee: Toray Industries, Inc., Japan

[21] Appl. No.: 43,273

[22] Filed: Apr. 6, 1993

[30] Foreign Application Priority Data

Apr. 8, 1992 [JP] Japan ................... 4-085803
Feb. 22, 1993 [JP] Japan ................... 5-032203

[51] Int. Cl.$^6$ .................. C09K 19/38; C09K 19/52
[52] U.S. Cl. .................. 252/299.01; 252/299.66; 252/299.67; 428/1
[58] Field of Search ........... 252/299.01, 299.5, 299.66, 252/299.67; 428/1

[56] References Cited

U.S. PATENT DOCUMENTS

| | | | |
|---|---|---|---|
| 4,861,515 | 8/1989 | Minamisawa et al. | 252/299.01 |
| 4,888,127 | 12/1989 | Wada et al. | 252/299.5 |
| 5,085,807 | 2/1992 | Okamoto et al. | 252/299.5 |
| 5,158,701 | 10/1992 | Asai et al. | 252/299.01 |
| 5,221,705 | 6/1993 | Inoue et al. | 524/120 |

FOREIGN PATENT DOCUMENTS

| | | |
|---|---|---|
| 0271327 | 6/1988 | European Pat. Off. |
| 0319205 | 6/1989 | European Pat. Off. |
| 49-72393 | 7/1974 | Japan. |
| 54-77691 | 6/1979 | Japan. |
| 57-24407 | 5/1982 | Japan. |
| 57-172921 | 10/1982 | Japan. |
| 61-195156 | 8/1986 | Japan. |
| 61-285249 | 12/1986 | Japan. |
| 62-81448 | 4/1987 | Japan. |
| 63-146958 | 6/1988 | Japan. |
| 63-146959 | 6/1988 | Japan. |
| 64-33123 | 2/1989 | Japan. |
| 1270492 | 10/1989 | Japan. |
| 1-301516 | 12/1989 | Japan. |
| 2-14246 | 1/1990 | Japan. |
| 2-16150 | 1/1990 | Japan. |

OTHER PUBLICATIONS

*Rubber Digest*, vol. 27, No. 8, 1975, pp. 7–14.

*Primary Examiner*—Shean Wu
*Attorney, Agent, or Firm*—Austin R. Miller

[57] ABSTRACT

The present invention relates to (A) 100 parts by weight of a liquid crystal polyester and/or liquid crystal polyesteramide capable of forming an anisotropic melt and (B) a liquid crystal polymer composition containing 5 to 300 parts by weight of a potassium titanate whisker having a pH of 6 to 8, wherein, the melt viscosity of the composition is 12 to 300 Pa·sec, and the weight average fiber length of the potassium titanate whisker in the composition is at least 4.5 μm, the liquid crystal polymer composition having low anisotropy as well as balanced properties of superior dimensional stability, lubricating property (wear resistance), thin-wall moldability, heat resistance and mechanical properties, thereby allowing it to be useful as electrical and electronic parts, automotive parts, audio parts and various types of machine parts, and particularly as bearing and wear applications required to have lubricating property (wear resistance).

14 Claims, No Drawings

LIQUID CRYSTAL POLYMER COMPOSITION

BACKGROUND OF THE INVENTION (A) Field of the Invention

The present invention relates to a liquid crystal polymer composition having balanced properties of excellent mechanical characteristics, heat resistance, thin wall moldability, dimensional stability and lubricating property (wear resistance) as well as a property capable of providing molded articles having excellent appearance. More specifically, it relates to a liquid crystal polymer composition capable of forming thin-walled molded articles having improved strength and anisotropy and having a high critical PV value and superior lubricating property (wear resistance) whereby the degree of damage of soft metals such as aluminum alloy becomes extremely low. The present liquid crystal polymer composition is suitable for use in various applications including, for example, electrical parts, electronic and equipment parts, automotive parts, precision machinery parts, audio parts, optical fiber parts, office automation equipment parts and chemical apparatus parts.

(B) Description of the Prior Art

The need for plastic materials having high performance have been growing in recent years. Numerous polymers having various new types of performance have been developed and marketed. However, optical anisotropic liquid crystal polymers characterized by parallel sequences of molecular chains, have been particularly noted due to their superior flowability and mechanical properties. Examples of such polymers capable of forming an anisotropic melt include, for example, a liquid crystal polyester obtained by copolymerizing polyethyleneterephthalate with p-hydroxybenzoic acid (Japanese Unexamined Patent Publication No. 49-72393), a liquid crystal polyester obtained by copolymerizing p-hydroxybenzoic acid and 6-hydroxy-2-naphthoic acid (Japanese Unexamined Patent Publication No. 54-77691), a liquid crystal polyester obtained by copolymerizing 4,4'-dihydroxybiphenyl, terephthalic acid and isophthalic acid with p-hydroxybenzoic acid (Japanese Examined Patent Publication No. 57-24407), a liquid crystal polyester amide formed from 6-hydroxy-2-naphthoic acid, p-aminophenol and terephthalic acid (Japanese Unexamined Patent Publication No. 57-172921), and a liquid crystal polyesteramide formed from p-hydroxybenzoic acid, 4,4'-dihydroxybiphenyl, terephthalic acid, p-aminobenzoic acid and polyethylene terephthalate (Japanese Unexamined Patent Publication No. 64-33123).

However, it is also well known in the art that these liquid crystal polymers have disadvantages including low mechanical strength in the direction perpendicular to the flow direction and a large molding shrinkage, or in other words, mechanical anisotropy and dimensional anisotropy are extremely large. Although liquid crystal polymers are especially used as thin-walled molded products due to their superior flowability and mechanical properties, there are problems in that the thinner the walls of the molded products, the larger anisotropy becomes. Examples of methods that have been proposed to improve the above-mentioned disadvantages include a method wherein a glass fiber is added to a liquid crystal polymer (Rubber Digest, Vol. 27, No. 8, pp. 7–14, 1975), a method wherein a potassium titanate fiber is blended into a totally aromatic copolyester (Japanese Unexamined Patent Publication No. 61-195156), a method wherein a potassium titanate fiber having no water is blended into a thermotropic liquid crystal polymer (Japanese Unexamined Patent Publication No. 62-81448), and a composite material comprising a thermoplastic synthetic resin and a potassium 6-titanate fiber (Japanese Unexamined Patent Publication No. 1-301516).

However, in the case of the former attempt, namely, a method involving the addition of a glass fiber, is effective in reducing anisotropy, but the impact strength is decreased, the appearance becomes poor and the flowability is impaired. In addition, in relation to the abrasive wear resistance, although the critical PV value are improved, the damage given to the opposing material becomes conversely large, and therefore, this method has the fatal defect of being extremely difficult to be used practically in applications requiring large abrasive wear resistance. In addition, in the latter method involving the blending of a potassium titanate fiber, although this method is effective to a certain extent in improving the appearance of molded products and improving abrasive wear resistance, these effects are not necessarily sufficient. Thus, since the mechanical performance and the anisotropy of thin-walled molded products are inferior compared to the former method, these methods cannot be used practically. One of the reasons why the mechanical performance is poor is considered to be the result of elution of alkaline components from the potassium titanate during blending of potassium titanate fiber into the polymer at high temperatures (and more remarkable in the case where the potassium titanate fibers are broken). These alkaline components are dissolved in the minute amount of water contained in the polymer, whereby the hydrolysis of the polymer is promoted. It has also been learned that the decrease in mechanical performance is more remarkable especially in the case of the liquid crystal polymer containing ethylenedioxy units as is disclosed in Japanese Unexamined Patent Publication No. 49-72393.

SUMMARY OF THE INVENTION

Accordingly, the first object of the present invention is to provide a liquid crystal polymer composition having balanced properties of low anisotropy, superior mechanical properties, heat resistance, thin wall moldability, dimensional stability and lubricating property (wear resistance), as well as the properties capable of providing molded articles having an excellent appearance.

Another object of the present invention is to provide a liquid crystal polymer composition which is useful as engineering plastics in various applications including electrical and electronic parts represented by sensors, LED lamps, connectors, sockets, resistors, relay case switches, coil bobbins, condensers, variable condensers, optical pick-ups, oscillators, various types of terminal boards, transformers, plugs, printed circuit boards, tuners, speakers, microphones, headphones, small motors, magnetic head bases, power modules, semiconductors, FDD carriages, FDD chassis motor brush holders, parabolic antennas and computer parts; home appliance and electrical office product parts represented by VTR parts, television parts, irons, hair dryers, rice cooker parts, microwave oven parts, audio parts, audio equipment parts such as those for audio laser disks and compact disks, lighting parts, refrigerator parts, air conditioner parts, typewriter parts and word processor parts; mechanical parts represented by office computer parts, telephone parts, facsimile parts copier parts, cleaning tools, motor parts, lighters and typewriters; optical equipment and precision machinery parts represented by microscopies, binoculars, cameras and clocks; and, automotive and vehicular parts such as alternator connectors, IC regulators, potentiometer bases, various valves such as exhaust gas valves, various fuel, exhaust and air intake pipes, air intake nozzle snorkels, intake manifolds, fuel pumps, engine coolant joints, carburetor main bodies, carburetor spacers, exhaust gas sensors, coolant sensors, oil temperature sensors, brake pad wear sensors, throttle position sensors, crankshaft position sensors, air flow meters, brake pad wear sensors, air conditioner thermostat bases, heater air flow control valves, radiator motor brush holders, water pump impellers, turbine vanes, wiper motor parts, distributors, starter switches, starter relays, transmission wire harnesses, window washer nozzles, air conditioner panel switch plates, fuel system solenoid valve coils, fuse connectors, horn terminals, electrical equipment insulating plates, step motor rotors, solenoid bobbins, engine oil filters and ignition device cases.

The following provides a description of the constitution for achieving the objects of the present invention.

In accordance with the present invention, there is provided a liquid crystal polymer composition comprising (A) 100 parts by weight of at least one liquid crystal polymer selected from the group consisting of liquid crystal polyesters and liquid crystal polyester amides capable of forming an anisotropic melt; and (B) 5 to 300 parts by weight of a potassium titanate whisker having a pH of 6 to 8, wherein, the weight average fiber length of the potassium titanate whisker in the polymer composition is at least 4.5 μm, and the melt viscosity of the polymer composition is within the range of 12 to 300 Pa·sec.

In accordance with the present invention, there is provided a process for producing a liquid crystal polymer composition comprising the steps of:
(i) continuously feeding (A) at least one liquid crystal polymer selected from the group consisting of liquid crystal polyesters and liquid crystal polyesteramides capable of forming an anisotropic melt into a twin-screw extruder;
(ii) continuously feeding (B) a potassium titanate whisker having a pH of 6 to 8 into the liquid crystal polymer (A) in the twin-screw extruder; and
(iii) blending by melting and kneading 100 parts by weight of the liquid crystal polymer (A) and 5 to 300 parts by weight of the potassium titanate whisker (B), wherein the weight average fiber length of potassium titanate whisker in the polymer composition is at least 4.5 μm and the melt viscosity of the polymer composition is within a range of 12 to 300 Pa·sec.

PREFERRED EMBODIMENTS OF THE INVENTION

The liquid crystal polyesters and the liquid crystal polyesteramides capable of forming an anisotropic melt referred to in the present invention are liquid crystal polyesters which form an anisotropic melt comprising structural units selected from structural units such as an aromatic oxycarbonyl unit, an aromatic dioxy unit, an aromatic dicarbonyl unit and an ethylenedioxy unit, and a liquid crystal polyesteramides which forms an aniso- tropic melt comprising structural units such as the above-mentioned structural units, an aromatic iminocarbonyl unit, an aromatic diimino unit and an aromatic iminooxy unit.

Preferable examples of liquid crystal polyesters capable of forming an anisotropic melt include liquid crystal polyesters that form an anisotropic melt comprising the structural units of "(I), (II) and (IV)", "(I), (II), (III) and (IV)" or "(I), (III) and (IV)" indicated below.

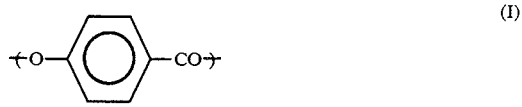

wherein, R$^1$ represents one or more types of groups selected from:

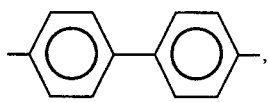

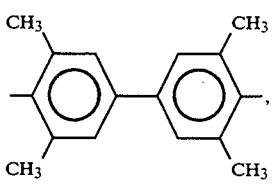

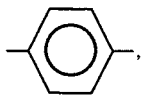

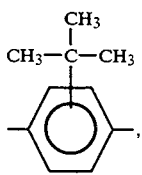

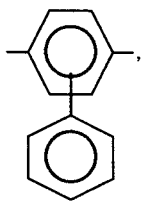

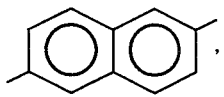

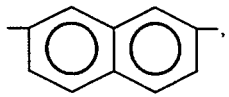

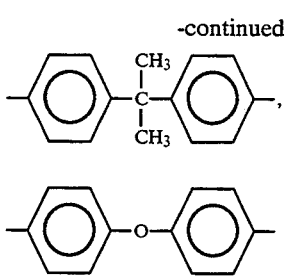

and R² represents one or more types of groups selected from:

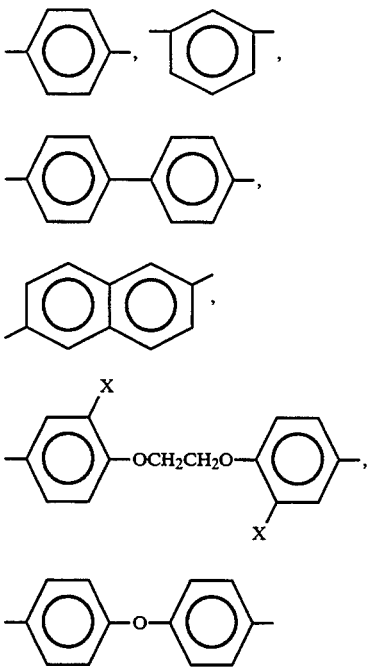

wherein X represents a hydrogen atom or chlorine atom, and the total number of moles of structural unit (II) and structural (III) is essentially equal to the total number of moles of structural unit (IV).

Structural unit (I) is a structural unit of a polyester formed from p-hydroxybenzoic acid. Structural unit (II) represents a structural unit formed from an aromatic dihydroxy compound selected from 4,4'-dihydroxybiphenyl, 3,3',5,5'-tetramethyl-4,4'-dihydroxyphenyl, hydroquinone, t-butylhydroquinone, phenyihydroquinone, 2,6-dihydroxynaphthalene, 2,7-dihydroxynaphthalene, 2,2-bis(4-hydroxyphenyl)propane and 4,4'-dihydroxyphenylether. Structural unit (III) represents a structural unit formed from ethyleneglycol. Structural unit (IV) represents a structural unit formed from an aromatic dicarboxylic acid selected from terephthalic acid, isophthalic acid, 4,4'-diphenyldicarboxylic acid, 2,6-naphthalenedicarboxylic acid, 1,2-bis(phenoxy)ethane-4,4'-dicarboxylic acid, 1,2-bis(2-chlorophenoxy)ethane-4,4'-dicarboxylic acid and 4,4'-diphenylether dicarboxylic acid.

In addition, examples of liquid crystal polyester amide polymers include a liquid crystal polyesteramide formed from 6-hydroxy-2-naphthoic acid, p-aminophenol and terephthalic acid, and a liquid crystal polyesteramide formed from p-hydroxybenzoic acid, 4,4'-dihydroxyphenyl, terephthalic acid, p-aminobenzoic acid and polyethylene terephthalate (Japanese Unexamined Patent Publication No. 64-33123).

The liquid crystal polymers particularly preferably usable in the present invention are liquid crystal polyester copolymers comprising the above-mentioned structural units "(I), (II) and (IV)" or "(I), (II), (III) and (IV)", and the copolymerization amounts of the above-mentioned structural units (I), (II), (III) and (IV) are not limited. However, the following copolymerization amounts are preferable in consideration of the flowability property thereof.

Namely, in the case of those containing the above-mentioned structural unit (III), the molar fraction of the total of the structural units (I) and (II) to the total of the above-mentioned structural units (I), (II) and (III) is preferably 60 to 95 mol %, particularly preferably 75 to 94 mol %, and more particularly preferably 82 to 93 mol % in consideration of the heat resistance, flame resistance and mechanical properties thereof. In addition, the molar fraction of the structural unit (III) to the total of the structural units (I), (II), and (III) is preferably 40 to 5 mol %, particularly preferably 25 to 6 mol % and more particularly preferably 18 to 7 mol %.

In addition, the molar fraction of the structural unit (I) to the total of the structural unit (I) and (II) is preferably 75 to 95 mol %, and particularly preferably 78 to 93 mol % in consideration of the balance between the heat resistance and the flowability. Furthermore, it is preferable that, the total number of moles of the structural unit (II) and the structural unit (III) is substantially equal to the total number of moles of the structural unit (IV).

One the other hand, in the case of those not containing the above-mentioned structural unit (III), the molar fraction of the structural unit (I) to the total of the structural units (I) and (II) is preferably 40 to 90 mol %, and particularly preferably 60 to 88 mol %. It is preferable that the number of moles of the structural unit (II) is substantially equal to the number of moles of the structural unit (IV).

Furthermore, when the above-mentioned liquid crystal polyesters particularly preferably usable in the present invention is copolymerized, aromatic dicarboxylic acids such as 3,3'-diphenyldicarboxylic acid and 2,2'-diphenyldicarboxylic acid, aliphatic dicarboxylic acids such as adipic acid, azelaic acid, sebacic acid and dodecanedionic acid, alicyclic dicarboxylic acids such as hexahydroterephthalic acid, aromatic diols such as chlorohydroquinone, methylhydroquinone, 4,4'-dihydroxydiphenylsulfone, 4,4'-dihydroxydiphenylsulfide and 4,4'-dihydroxybenzophenone, aliphatic and alicyclic diols such as 1,4-butanediol, 1,6-hexanediol, neopentylglycol, 1,4-cyclohexanediol and 1,4-cyclohexanedimethanol, aromatic hydroxycarboxylic acids such as m-hydroxybenzoic acid and 2,6-hydroxynaphthoic acid, and p-aminophenol and p-aminobenzoic acid can be additionally used, other than the above-mentioned components forming the structural units (1) to (4) within a range of low proportions to an extent that does not impair the object of the present invention.

There are no particular limitations to the process for producing the above-mentioned liquid crystal polyesters preferably usable in the present invention and the liquid crystal polyester can be produced according to any known polyester condensation polymerization methods.

For example, in the case of those not containing the above-mentioned structure unit (III) can be preferably produced by the following method (1) to (4), and in the case of those containing the structural unit (III) can be preferably produced by the following method (5).

(1) A production process using a condensation polymerization with the removal of acetic acid from a diacrylated product of p-acetoxybenzoic acid, an aromatic dihydroxy compound such as 4,4'-diacetoxybiphenyl or para-4,4'-diacetoxybenzene, and an aromatic dicarboxylic acid such as terephthalic acid.

(2) A production process using a condensation polymerization reaction with the removal of acetic acid from the reaction of p-hydroxybenzoic acid and an aromatic dihydroxy compound such as 4,4'-dihydroxybiphenyl or hydroxyquinone, and acetic anhydride with an aromatic dicarboxylic acid such as terephthalic acid, followed by acylation of phenolic hydroxyl groups.

(3) A production process using a condensation polymerization reaction with the removal of phenol from the p-hydroxybenzoic acid, an aromatic dihydroxy compound such as 4,4'-dihydroxybiphenyl or hydroquinone, and a diphenylester of an aromatic dicarboxylic acid such as terephthalic acid.

(4) A production process using a condensation polymerization reaction with the removal of phenol wherein a prescribed amount of diphenylcarbonate is reacted with p-hydroxybenzoic acid and an aromatic dicarboxylic acid such as terephthalic acid to form the corresponding phenylester, followed by the addition of an aromatic dihydroxy compound such as 4,4'-dihydroxybiphenyl or hydroquinone.

(5) A production process according to the above-mentioned (1) or (2) carried out in the presence of a polymer or oligomer such as polyethylene terephthalate, or a bis($\beta$-hydroxyether)ester of an aromatic dicarboxylic acid such as bis($\beta$-hydroxyethyl)terephthalate.

In addition, a catalyst may be optionally used during these condensation polymerization reactions. Typical examples of such catalysts usable in the condensation polymerization reaction include metal compounds such as stannous acetate, tetrabutyltitanate, potassium acetate, sodium acetate, antimony trioxide and magnesium metal, and these catalysts are particularly effective during the condensation polymerization with the removal of phenol.

The logarithmic viscosity (or inherent viscosity) of the liquid crystal polymer (A) according to the present invention can be measured in pentafluorophenol. It is preferable that the value measured at 60° C. at a concentration of 0.1 g/dl is at least 0.5 dl/g, and particularly in the case of those containing the above-mentioned structural unit (III), the value of 1.0 to 3.0 dl/g is preferable. On the other hand, in the case of those not containing the above-mentioned structural unit (III), the logarithmic viscosity (or inherent viscosity) value of 2.0 to 10.0 dl/g is preferable.

In addition, the melt viscosity of the liquid crystal polymer (A) usable in the present invention is preferably 15 to 300 Pa·sec, and more preferably 18 to 200 Pa·sec.

Furthermore, the above-mentioned melt viscosity refers to the value measured at a temperature 10° C. higher than the melting point of the liquid crystal resin (A) using a Koka type flow tester under the conditions of a shear rate of 1,000 (1/sec) and a nozzle size of 0.5 mm in diameter by 1.0 mm in length.

The melting point (Tm, °C.) referred herein represents the endothermic peak temperature which is observed when the measurement is carried out at a temperature-elevating rate of 20° C./min by using a differential scanning calorimeter, i.e., $Tm_2$, described hereinafter.

For the differential scanning calorimetric measurement described above, a polymer obtained by polymerization is heated from room temperature to a temperature exceeding the melting point at a temperature-elevating rate of 20° C./min, and the observed endothermic peak temperature (hereinafter referred to as "$Tm_1$") is measured. After the measurement of $Tm_1$, the polymer is maintained at a temperature of $Tm_1+20$° C. for 5 minutes, followed by cooling once down to room temperature at a temperature-dropping rate of 20° C./min, and the temperature is then elevated at a rate of 20° C./min. The endothermic peak temperature (hereinafter referred to as "$Tm_2$") measured at this second run is measured.

The potassium titanate whisker usable in the present invention is manufactured by, for example, baking, melting, hydrothermal reaction, or fluxing method, from, for example, $K_2O$ and $TiO_2$ as the starting materials. Examples of the chemical formulae of the potassium titanate whisker include $K_2TiO_3$, $K_2Ti_2O_5$, $K_2Ti_4O_9$, $K_2Ti_6O_{13}$, $K_2Ti_8O_{17}$ and $K_2Ti_{16}O_{13}$. Potassium 6-titanate whisker having the chemical formula $K_2Ti_6O_{13}$ is particularly preferable due to its superior strengthening effect.

It is necessary that the pH of the potassium titanate whiskers is within the range of 6 to 8. When the pH is less than 6, the mechanical strength decreases and the lubricating property (wear resistance) becomes poor. On the other hand, when the pH is more than 8, the hydrolysis of the liquid crystal polymer is accelerated during the blending of the liquid crystal polymer and the potassium titanate whisker as well as during the molding processing, thus resulting in decreased mechanical property and particularly, decreased impact resistance. The pH is measured by adding 1 g of the potassium titanate whisker to 100 ml of ion exchanged water to prepare a suspension by stirring for 10 minutes, followed by measuring the value of pH of the suspension at 20° C.

In addition, the fiber diameter of the potassium titanate whisker having a pH of 6 to 8 is that within the range of 0.02 to 2 $\mu$m, and preferably within the range of 0.05 to 1 $\mu$m.

The blended amount of the potassium titanate whisker having a pH of 6 to 8 is preferably 5 to 300 parts by weight, particularly preferably 8 to 200 parts by weight, and more particularly preferably 10 to 1.50 parts by weight based on 100 parts by weight of the liquid crystal polymer. When the blended amount is less than 5 parts by weight, the desired effect of the present invention is not remarkable. When the blended amount is more than 300 parts by weight, the appearance of the molded articles is impaired and the mechanical properties thereof are decreased.

The surface of the potassium titanate whisker having a pH of 6 to 8 usable in the present invention can be treated with, for example, a coupling agent (e.g. silane coupling agent, titanate coupling agent, aluminum coupling agent or zircoaluminate coupling agent). The effect of the present invention can be more efficiently demonstrated by treatment with the coupling agent.

Specific examples of coupling agents preferably usable in the present invention include silane coupling agents such as γ-(2-aminoethyl)aminopropyltrimethoxysilane, γ-glycidoxypropyltrimethoxysilane, γ-mercaptopropyltrimethoxysilane, hydroxypropyltrimethoxysilane, γ-ureidopropyltrimethoxysilane and vinylacetoxysilane, titanate coupling agents such as isopropyl-trisisostearoyltitanate, isopropyl-tris(dioctylpyrophosphate)titanate, isopropyltris(N-aminoethyl-aminoethyl)titanate, tetraoctyl-bis(ditridecylphosphate)ethylenetitanate and isopropyltris(dioctylphosphate)titanate, or aluminate coupling agents such as acetoalkoxyaluminum diisopropylate.

The weight average fiber length of the potassium titanate whisker having a pH of 6 to 8 present in the liquid crystal polymer composition of the present invention is at least 4.5 μm, preferably 4.5 to 50 μm, more preferably 5 to 45 μm, and more particularly preferably 6 to 40 μm. When the weight average fiber length is 4.5 μm or more, the superior mechanical property and heat resistance, favorable lubricating property (wear resistance) and low anisotropy can be obtained.

The method for measuring the weight average fiber length first involves ashing 3g of the liquid crystal polymer composition to prepare a dispersed liquid wherein 100 mg of the resultant ash is dispersed in 10 ml of ethylene glycol. Next, one drop (about 0.2g) of the dispersed liquid is placed onto a glass slide using a syringe, covered with a cover glass and allowed to stand for 30 minutes to prepare the sample for measurement of weight average fiber length. After preparing 5 samples, each sample was observed microscopically and photomicrographs were taken. The fiber length of the photographed potassium titanate whiskers were then measured to determine the weight average fiber length.

The organic bromine compound optionally usable as the component (C) in the present invention includes known organic bromine compounds normally used as a flame retardant, and is preferably included in the present polymer composition at a bromine content of 20% by weight or more. The preferable examples thereof include low molecular weight organic bromine compounds such as hexabromobenzene, pentabromotoluene, hexabromobiphenyl, decabromobiphenyl, hexabromocyclododecane, decabromobiphenylether, octabromodiphenylether, hexabromodiphenylether, bis(-pentabromophenoxy)ethane, ethylene-bis(tetrabromophthalimide) and tetrabromobisphenol A, brominated polycarbonates (for example, polycarbonate oligomers or their copolymers with bisphenol A that are manufactured using brominated bisphenol A as the raw material), brominated epoxy compounds (for example, diepoxy compounds obtained by reaction of brominated bisphenol A and epichlorohydrin, and monoepoxy compounds obtained by reaction of brominated phenols and epichlorohydrin), condensation products of poly(brominated benzylacrylate), brominated polyphenylene ether, brominated bisphenol A, cyanuryl chloride and brominated phenol, halogenated polymers and oligomers of brominated polystyrene, crosslinked brominated polystyrene and crosslinked brominated poly-α-methylstyrene, or mixtures of these. Particularly preferable examples include ethylene-bis(tetrabromophthalimide), brominated epoxy oligomers or polymers, brominated polystyrene, crosslinked brominated polystyrene, brominated polyphenylene ether and brominated polycarbonate the brominated polystyrene can be used most preferably.

The following provides a more detailed description of the above-mentioned preferable organic bromine compound. A preferable example of a brominated epoxy polymer is represented by the following general formula (i).

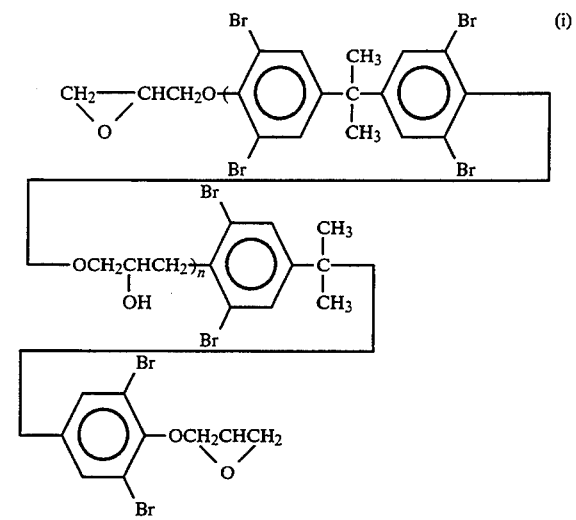

In the above-mentioned general formula (i), n is preferably 15 or more, and more preferably 50 to 80.

Examples of the brominated polystyrenes include brominated polystyrene manufactured by brominating a polystyrene obtained by radical or anionic polymerization, or the brominated polystyrene having brominated styrene units represented with formula (ii) and/or (iii) manufactured by radical or anionic polymerization, but preferably radical polymerization, of brominated styrene monomer. However, poly(brominated styrene) having a weight average molecular weight of $1 \times 10^3$ to $120 \times 10^4$, and having the structural unit represented with the formula (ii) and/or (iii) indicated below, obtained from a brominated styrene monomer as its major structural unit, is preferable.

The brominated styrene monomer referred to here is preferably that wherein 2 to 3 bromine atoms are introduced by a substitution reaction into the aromatic ring, which may contain monobrominated styrene and so forth, in addition to dibrominated styrene and/or tribrominated styrene.

The preferable above-mentioned poly(brominated styrene) contains at least 60% by weight, and more preferably at least 70% by weight, of dibrominated styrene and/or tribrominated styrene units. Thus, the poly(brominated styrene) may also include 40% by weight or less, and preferably 30% by weight or less, of monobrominated styrene copolymerized therewith, in addition to dibrominated styrene and/or tribrominated styrene. The weight average molecular weight of the poly(brominated styrene) is more preferably $1 \times 10^4$ to $15 \times 10^4$. Furthermore, the weight average molecular weight used herein refers to the value as measured using a gel permeation chromatography, which is a relative value, based on the molecular weight of polystyrene.

The crosslinked brominated polystyrene is preferably a polystyrene resulting from the bromination of porous polystyrene crosslinked with divinylbenzene.

Preferable examples of the brominated polycarbonate are those having the general formula (iv) indicated below.

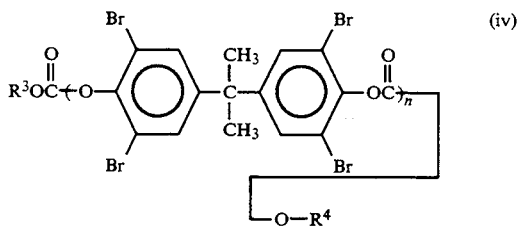

wherein $R^3$ and $R^4$ represent substituted or unsubstituted aryl groups, most preferably p-t-butylphenyl group.

In the above-mentioned general formula (iv), the degree of polymerization n is preferably 4 or more, particularly preferably 8 or more, and more particularly preferably 8 to 25.

The amount of these organic brominated compounds (C) blended is preferably 0.5 to 60 parts by weight, and more preferably 1 to 30 parts by weight, based, upon 100 parts by weight of liquid crystal polymer.

In addition,, the organic brominated compound in the flame-retardant liquid crystal polymer composition of the present invention is preferably dispersed at an average diameter of 2.5 μm or less, and more preferably at a average diameter of 2.0 μm or less, in the composition.

Furthermore,, the liquid crystal polymer composition of the present invention can be given the desired properties by adding conventional additives and the other thermoplastic resins within the range to an extent which does not impair the object of the present: invention. Examples of such additives include, for example, antioxidants and heat stabilizers (e.g. hindered phenol, hydroquinone, phosphites and their substituted forms), UV absorbents (e.g. resorcinol, salicylate, benzotriazole and benzophenone), lubricants and mold releasing agents (e.g. montan acid, its salts, esters and half esters, stearyl alcohol, stearamide and polyethylene wax), coloring agents containing dyes (e.g. nigrosine) and pigments (e.g. cadmium sulfate, phthalocyanine and carbon black), plasticizers and antistatic agents.

The liquid crystal polymer composition of the present invention is preferably produced by melting and kneading, and the composition can be produced by melting and kneading at 200° to 400° C. using, for example, a Banbury mixer, rubber rolls, kneader or single or twin-screw extruder for melting and kneading. In particular, according to the recommendable method, a twin-screw extruder is used to disperse the potassium titanate whisker having a pH of 6 to 8 present in the liquid crystal polymer composition in such a state that the weight average fiber length of 4.5 μm or more, and the liquid crystal polymer and the potassium titanate whisker having a pH of 6 to 8 is separately and continuously fed to the twin-screw extruder. It is particularly preferable to add the potassium titanate whisker after the liquid crystal polymer has melted.

The following indicates detailed examples of the above-mentioned method.

(1) A separate addition port (intermediate addition port) is provided at an arbitrary location between the raw material feed port (liquid crystal polymer addition port) and the end nozzle, portion and the potassium titanate whisker having a pH of 6 to 8 is continuously fed from the intermediate addition port to the melted liquid crystal polymer.

(2) The twin-screw extruder has a screw arrangement whereby melting and kneading are performed by providing a zone for melting of the liquid crystal polymer, and a zone for kneading the melted liquid crystal polymer and the potassium titanate whisker having a pH of 6 to 8.

(3) Melting and kneading are performed whereby the polymer temperature during kneading of the liquid crystal polymer and the potassium titanate whisker having a pH of 6 to 8 is within the range from the liquid crystal starting temperature to the melting point (Tm)+40° C., and preferably within the range from Tm to Tm+40° C.

The liquid crystal starting temperature used herein refers to the temperature at which opalescence is generated under a shear stress after placing on the sample stage of a polarizing microscope and raising the temperature by heating. The use of at least one of the above-mentioned methods (1) to (3) facilitates the production of the present composition.

The melt viscosity of the liquid crystal polymer composition according to the present invention is within the range of 12 to 300 Pa·sec, preferably within the range of 13 to 200 Pa·sec, and more preferably within the range of 15 to 150 Pa·sec. When the melt viscosity is less than 10 Pa·sec, the mechanical property is unpreferably decreased. When the melt viscosity is more than 300 Pa·sec, the fluidity becomes inadequate, whereby the thin-wall moldability becomes poor.

Furthermore, the above-mentioned melt viscosity of the liquid crystal polymer composition is measured by using an Koka type flow tester at a temperature of 10° C. higher than the melting point (Tm) and under the conditions of a shear rate of 1,000 (1/sec) and a nozzle size measuring 1.0 mm in diameter and 10 mm in length.

The above-mentioned liquid crystal polymer composition according to the present invention can provide the molded articles having excellent heat resistance, mechanical properties, lubricating property (wear resistance) and low anisotropy by ordinary molding methods such as injection molding, extrusion molding or blow molding. In particular, those molded articles made by molding the liquid crystal polymer composition of the present invention having thin wall portions of a thickness of 0.5 mm or less demonstrate superior performance, which has not been obtained from other materials.

EXAMPLES

The present invention will now be further illustrated by, but is by no means limited to, the following Examples.

Reference Example 1

A 994 part by weight amount of p-hydroxybenzoic acid, 126 parts by weight of 4,4'-dihydroxybiphenyl, 112 parts by weight of terephthalic acid and 216 parts by weight of polyethylene terephthalate having an inherent viscosity of approximately 0.6 dl/g were charged into a reaction vessel equipped with a stirrer and a distillation tube to obtain the following liquid crystal polyesters ($a_1$, $a_2$, $a_3$) by condensation polymerization.

| Polyester | Melt Viscosity (Pa.sec) |
|---|---|
| $a_1$ | 6 |
| $a_2$ | 25 |
| $a_3$ | 380 |

The liquid crystal starting temperature of these liquid crystal polyesters was approximately 293° C., and the melting point (Tm) was approximately 314° C.

Reference Example 2

A 994 part by weight amount of p-hydroxybenzoic acid, 222 parts by weight of 4,4'-dihydroxybiphenyl, 147 parts by weight of 2,6-diacetoxynaphthalene, 1078 parts by weight of acetic anhydride and 299 parts by weight of terephthalic acid were charged into a reaction vessel equipped with a stirrer and a distillation tube to obtain liquid crystal polyester (b) having a melt viscosity of 52 Pa·sec by condensation polymerization.

The liquid crystal starting temperature of this liquid crystal polyester was 296° C., and the melting point (Tm) was 336° C.

Reference Example 3

A 921 parts by weight of p-acetoxybenzoic acid and 435 parts by weight of 6-acetoxy-naphthoic acid were charged into a reaction vessel equipped with a stirrer and distillation tube according to Japanese Unexamined Patent Publication No. 54-77691, followed by condensation polymerization to obtain liquid crystal polyester (c) having a melt viscosity of 200 Pa·sec.

The liquid crystal starting temperature of the above-mentioned liquid crystal polyester was 251° C., and the melting point (Tm) was 283° C.

Reference Example 4

A 1296 parts by weight of p-acetoxybenzoic acid and 346 parts by weight of polyethylene terephthalate having an inherent viscosity of approximately 0.6 dl/g were charged into a reaction vessel equipped with a stirrer and a distillation tube according to Japanese Unexamined Patent Publication No. 49-72393, followed by condensation polymerization to obtain the liquid crystal polyester (d) having a melt viscosity of 120 Pa·sec.

The liquid crystal starting temperature of the above-mentioned liquid crystal polyester was 265° C., and the melting point (Tm) was 283° C.

Reference Example 5

Table 1 indicates the structures and pH values of the potassium titanate whiskers A to C used in the present invention.

TABLE 1

| No. | Structure | pH |
|---|---|---|
| (A) | Potassium 2-titanate whisker | 9.2 |
| (B) | Potassium 4-titanate whisker | 9.3 |
| (C) | Potassium 6-titanate whisker | 6.9 |

Reference Example 6

Table 2 indicates the structures of the organic bromine compounds used in the present invention.

TABLE 2

| No. | Structure |
|---|---|
| FR-1 | Poly(brominated styrene) obtained by polymerization of a monomer containing 80% by weight of dibrominated styrene, 15% by weight of monobrominated styrene, and 5% by weight of tribrominated styrene (bromine content: 59%) Weight average molecular weight: $30 \times 10^4$ |
| FR-2 | Poly(brominated styrene) obtained by polymerization of tribrominated styrene monomer (bromine content: 68%) Weight average molecular weight: $30 \times 10^4$ |
| FR-3 | Dibrominated polystyrene obtained by bromination of polystyrene (bromine content: 60%) Weight average molecular weight: $26 \times 10^4$ |
| FR-4 | Tribrominated polystyrene obtained by bromination of polystyrene (bromine content: 68%) Weight average molecular weight: $25 \times 10^4$ |
| FR-5 | Brominated epoxy |
| FR-6 | Brominated polycarbonate |
| FR-7 | Ethylene-bis-tetrabromophthalamide |

Examples 1–5 and Comparative Examples 1–14

The liquid crystal polyesters obtained in Reference Examples 1 to 4 and the potassium titanate whiskers obtained in Reference Example 5 were fed in the proportions indicated in Table 3 to a twin-screw extruder having a diameter of 35 mm. The twin-screw extruder has a raw material feed port and an intermediate addition port, and a screw arrangement wherein a polymer melting zone (Z-1) is provided between the raw material addition port and the intermediate addition port, and a kneading zone (Z-2) is provided between the intermediate addition port and the nozzle end. The above-mentioned liquid crystal polymers and potassium titanate whiskers were fed into the above-mentioned extruder according to the method indicated in Table 1 followed by melting and kneading to form pellets. These pellets were then fed into the Sumitomo Nestal Promat 40/25 Injection Molding Machine (Sumitomo Heavy Machine Industry K.K.) and molded into ASTM No. 1 size dumbbells and square plates measuring 30×30×3.2 mm under conditions of a cylinder temperature of the melting point +10° C. and a mold temperature of 90° C. The tensile strength of the resulting ASTM No. 1 size dumbbells was then measured. In addition, a abrasive wear testing was performed using the 30×30×3.2 mm square plates under the following conditions using a abrasive wear tester (Suzuki-type abrasive wear tester) to evaluate the lubricating property (wear resistance).

P=5 kgf/cm², V=20 m/min

Opposing material: Aluminum alloy 5056

Furthermore, square plates measuring 70×70×2 (thickness) mm and having a fill gate on one side were molded under conditions of a cylinder temperature of the melting point +10° C. and a mold temperature of 90° C. Following molding, the molding shrinkage was measured for each square in the direction of flow (MD) and perpendicular direction (TD). Anisotropy was then evaluated by determining |molding shrinkage in perpendicular direction (TD)| − |molding shrinkage in direction of flow (MD)|.

In addition, thin-walled rod-shaped molded products measuring 0.3 mm thick × 12.7 mm wide × 150 mm long were molded under conditions of a cylinder temperature of the melting point + 10° C., a mold temperature of 90° C. and injection pressure of 1130 kgf/cm². The flow length of the polymer was then measured to evaluate moldability of the thin-walled molded products. These results are indicated in Table 3.

TABLE 3

| | Liquid Crystal Polyester | | Potassium Titanate Whisker | | | |
|---|---|---|---|---|---|---|
| No. | Type | Blended Amt. Parts by Weight | Type | pH | Added Amt. Parts by Weight | Weight Average Length in Polymer μm |
| Example | | | | | | |
| 1 | a2 | 100 | C | 6.9 | 50 | 7.0 |
| 2 | a2 | 100 | C | 6.9 | 50 | 5.2 |
| 3 | b | 100 | C | 6.9 | 50 | 7.5 |
| 4 | c | 100 | C | 6.9 | 50 | 6.9 |
| 5 | d | 100 | C | 6.9 | 50 | 7.1 |
| Comparative Example | | | | | | |
| 1 | a1 | 100 | C | 6.9 | 50 | 7.5 |
| 2 | a3 | 100 | C | 6.9 | 50 | 5.5 |
| 3 | a2 | 100 | A | 9.2 | 50 | 6.7 |
| 4 | a2 | 100 | B | 9.3 | 50 | 6.8 |
| 5 | b | 100 | A | 9.2 | 50 | 6.7 |
| 6 | b | 100 | B | 9.3 | 50 | 6.7 |
| 7 | c | 100 | A | 9.2 | 50 | 6.5 |
| 8 | c | 100 | B | 9.3 | 50 | 6.5 |
| 9 | d | 100 | A | 9.2 | 50 | 6.6 |
| 10 | d | 100 | B | 9.3 | 50 | 6.6 |
| 11 | a2 | 100 | C | 6.9 | 50 | 4.2 |
| 12 | b | 100 | C | 6.9 | 50 | 4.0 |
| 13 | c | 100 | C | 6.9 | 50 | 4.1 |
| 14 | d | 100 | C | 6.9 | 50 | 3.9 |

| | Extruding and Kneading Conditions | | | |
|---|---|---|---|---|
| No. | Extruding Machine | Cylinder Temp. °C. | Screw Arrangement | Location of Addition of Potassium Titanate Whisker |
| Example | | | | |
| 1 | Twin-screw | 314 | Z-1/Z-2 | Intermediate addition port |
| 2 | Twin-screw | 314 | Z-1/Z-2 | " |
| 3 | Twin-screw | 336 | Z-1/Z-2 | " |
| 4 | Twin-screw | 283 | Z-1/Z-2 | " |
| 5 | Twin-screw | 283 | Z-1/Z-2 | " |
| Comparative Example | | | | |
| 1 | Twin-screw | 314 | Z-1/Z-2 | " |
| 2 | Twin-screw | 314 | Z-1/Z-2 | " |
| 3 | Twin-screw | 314 | Z-1/Z-2 | " |
| 4 | Twin-screw | 314 | Z-1/Z-2 | " |
| 5 | Twin-screw | 336 | Z-1/Z-2 | " |
| 6 | Twin-screw | 336 | Z-1/Z-2 | " |
| 7 | Twin-screw | 283 | Z-1/Z-2 | " |
| 8 | Twin-screw | 283 | Z-1/Z-2 | " |
| 9 | Twin-screw | 283 | Z-1/Z-2 | " |
| 10 | Twin-screw | 283 | Z-1/Z-2 | raw material feed port |
| 11 | Twin-screw | 314 | Z-1/Z-2 | " |
| 12 | Twin-screw | 336 | Z-1/Z-2 | " |
| 13 | Twin-screw | 283 | Z-1/Z-2 | " |
| 14 | Twin- | 283 | Z-1/Z-2 | " |

TABLE 3-continued

| | | | | Thin-Wall Moldability Flow Length of Rod-Shaped | Lubricating Property (wear resistance) Opposing Material: Aluminum 5056 Amt. of Relative Abrasive Wear | |
|---|---|---|---|---|---|---|
| No. | Melt Viscosity of Composition Pa.sec | Tensile Strength kgf/cm² | Anisotropy Difference of Molding Shrinkage Between MD D Directions % | Product 0.3 mm Thick mm | Polymer Side ($\times 10^{-2}$ mm³/ kgf.km) | Aluminum Side ($\times 10^{-4}$ mm³/ kgf.km) |
| Example | | | | | | |
| 1 | 38 | 2050 | 0.82 | 78 | 10 | 43 |
| 2 | 37 | 2040 | 0.83 | 79 | 10 | 42 |
| 3 | 35 | 2100 | 0.78 | 80 | 9 | 45 |
| 4 | 160 | 2000 | 0.85 | 50 | 25 | 65 |
| 5 | 100 | 1800 | 0.83 | 60 | 30 | 70 |
| Comparative Example | | | | | | |
| 1 | 8 | 1200 | 1.32 | 90 | 110 | 130 |
| 2 | 320 | 1990 | 1.55 | Unmoldable | 90 | 140 |
| 3 | 31 | 1350 | 1.46 | 82 | 90 | 130 |
| 4 | 30 | 1250 | 1.46 | 83 | 91 | 132 |
| 5 | 28 | 1300 | 1.45 | 84 | 91 | 135 |
| 6 | 27 | 1200 | 1.45 | 84 | 91 | 137 |
| 7 | 120 | 1150 | 1.47 | 63 | 93 | 141 |
| 8 | 120 | 1100 | 1.47 | 63 | 93 | 142 |
| 9 | 75 | 900 | 1.47 | 69 | 94 | 155 |
| 10 | 70 | 900 | 1.47 | 70 | 95 | 150 |
| 11 | 35 | 1850 | 1.00 | 80 | 46 | 53 |
| 12 | 30 | 1900 | 1.01 | 82 | 48 | 56 |
| 13 | 140 | 1700 | 1.08 | 60 | 56 | 77 |
| 14 | 90 | 1650 | 1.09 | 68 | 58 | 78 |

Examples 6-14

Sample pellets of compositions were produced in the same manner as Example 1, except that the organic bromine compounds indicated in Reference Example 6 were blended with liquid crystal polymer from the raw material feed port in the proportions indicated in Table 4 based upon 100 parts by weight of the liquid crystal polymer in Example 1. These pellets were then fed into the Sumitomo Nestal Promat 40/25 Injection Molding Machine (Sumitomo Heavy Machine Industry K.K.) and molded into testpieces measuring 0.5 mm (thickness)×12.7 mm×127 mm, as well as strip testpieces measuring 0.8 mm (thickness) ×12.7 mm×127 mm under conditions of a cylinder temperature of the melting point +10° C. and a mold temperature of 90° C. A vertical combustion test was then performed according to UL94 standards using the testpieces to evaluate flame retardency. In addition, soldering heat resistance was evaluated using the strip testpieces. Soldering heat resistance was evaluated by determining the highest temperature at which blistering and deformation do not occur when the testpiece was immersed for 10 seconds in molten solder using a soldering tester manufactured by Device Bake Co., Ltd. Lubricating property (wear resistance) was evaluated by performing a performance evaluation by molding in the same manner as Example 1.

These results are shown in Table 4.

TABLE 4

| | Compound | | Weight Average Length in Polymer μm | Frame Retardancy UL-94 | Soldering Heat Resistance °C. | Lubricating Property (wear resistance) Opposing Material: Aluminum 5056 Amt. of Relative Abrasive Wear | |
|---|---|---|---|---|---|---|---|
| Example | Type | Amount Added Parts by Weight | | | | Polymer Side ($\times 10^{-2}$ mm³/ kfg.km) | Aluminum Side ($\times 10^{-4}$ mm³/ kgf.km) |
| 6 | FR-1 | 2 | 7.1 | V-O | 255 | 11 | 45 |
| 7 | FR-1 | 5 | 7.0 | V-O | 250 | 12 | 47 |
| 8 | FR-1 | 10 | 7.1 | V-O | 250 | 18 | 50 |
| 9 | FR-2 | 5 | 7.1 | V-O | 250 | 12 | 45 |
| 10 | FR-3 | 5 | 6.9 | V-O | 235 | 22 | 55 |
| 11 | FR-4 | 5 | 7.0 | V-O | 235 | 23 | 55 |
| 12 | FR-5 | 5 | 7.1 | V-O | 240 | 22 | 55 |
| 13 | FR-6 | 5 | 6.9 | V-O | 240 | 22 | 54 |
| 14 | FR-7 | 5 | 7.0 | V-O | 240 | 23 | 55 |

It is clear that the molded articles obtained from the liquid crystal polymer composition of the present invention have low anisotropy, superior thin-walled moldability as well as superior lubricating property (wear resistance) and appearance of molded article in comparison with the comparative Examples.

We claim:

1. A liquid crystal polymer composition comprising (A) 100 parts by weight of at least one liquid crystal polymer selected from the group consisting of liquid crystal polyesters and liquid crystal polyester amides capable of forming an anisotropic melt; and (B) 5 to 300 parts by weight of a potassium titanate whisker having a pH of 6 to 8; the weight average fiber length of the potassium titanate whisker in the polymer composition after blending being at least 4.5 μm, and the melt viscosity of the polymer composition being within the range of 12 to 300 Pa·sec.

2. A liquid crystal polymer composition as claimed in claim 1, wherein the weight average fiber length of the potassium titanate whisker in the polymer composition is 4.5 to 50 μm.

3. A liquid crystal polymer composition as claimed in claim 1, wherein the melt viscosity of the polymer composition is within the range of 15 to 150 Pa·sec.

4. A liquid crystal polymer composition as claimed in claim 1, wherein the liquid crystal polyester is a liquid crystal polyester which forms an anisotropic melt and which is composed of the following structural units "(I), (II) and (IV)" or "(I), (II), (III) and (IV)"

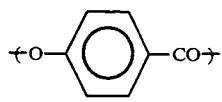 (I)

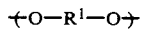 (II)

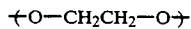 (III)

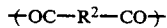 (IV)

wherein R¹ represents at least one group selected from the group consisting of:

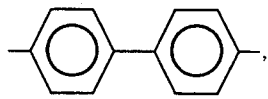

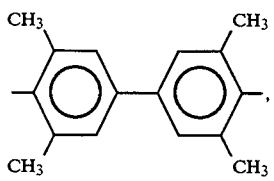

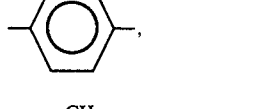

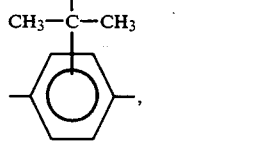

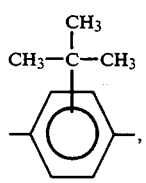

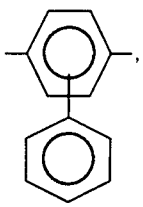

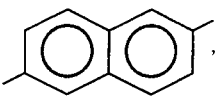

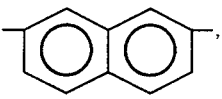

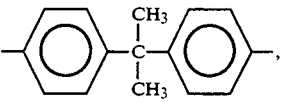

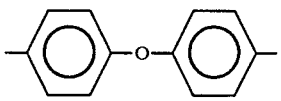

and R² represents at least one group selected from the group consisting of:

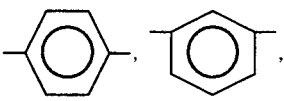

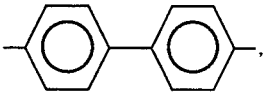

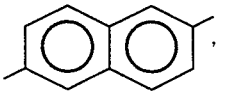

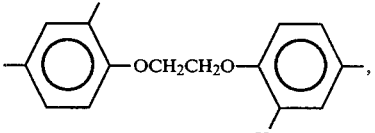

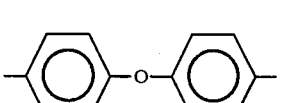

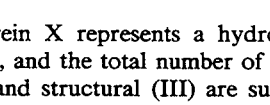

wherein X represents a hydrogen atom or chlorine atom, and the total number of moles of structural unit (II) and structural (III) are substantially equal to the total of the number of moles of structural unit (IV).

5. A liquid crystal polymer composition as claimed in claim 4, wherein the liquid crystal polyester is composed of structural units (I), (II) and (IV), and the molar fraction of structural unit (I) to the total of structural units (I) and (II) is 40 to 90 mol %.

6. A liquid crystal polymer composition as claimed in claim 4, wherein the liquid crystal polyester is composed of structural units (I), (II), (III) and (IV), the molar fraction of the total of structural units (I) and (II) to the total of structural units (I), (II) and (III) is 60 to 95 mol %, and the molar fraction of structural unit (III) to the total of structural units (I), (II) and (III) is 40 to 5 mol %.

7. A liquid crystal polymer composition as claimed in claim 1, wherein the potassium titanate whisker, (B) having a pH of 6 to 8 is potassium 6-titanate represented by the chemical formula $K_2Ti_6O_{13}$.

8. A liquid crystal polymer composition as claimed in claim 1 further comprising (C) 0.5 to 60 parts by weight of an organic bromine compound based upon 100 parts by weight of the liquid crystal polymer (A).

9. A liquid crystal polymer composition as claimed in claim 8, wherein the organic bromine compound (C) is poly(brominated styrene) having a weight average molecular weight of $1 \times 10^3$ to $120 \times 10^4$ and having at least one following structural unit obtained from brominated styrene monomer as the major structural component.

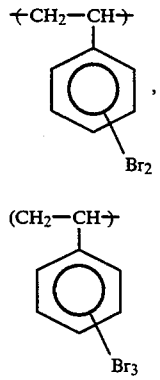

10. A process for producing a liquid crystal polymer composition comprising the steps of:
(i) continuously feeding (A) at least one liquid crystal polymer selected from the group consisting of liquid crystal polyesters and liquid crystal polyesteramides capable of forming an anisotropic melt into an extruder;
(ii) continuously feeding (B) a potassium titanate whisker having a pH of 6 to 8 into the liquid crystal polymer (A) in the extruder, and;
(iii) blending by melting and kneading 100 parts by weight of the liquid crystal polymer (A) and 5 to 300 parts by weight of the potassium titanate whisker (B), so that the weight average fiber length of potassium titanate whisker in the polymer composition is at least 4.5 μm and the melt viscosity of the polymer composition is within a range of 12 to 300 Pa·sec.

11. A process for producing a liquid crystal polymer composition as claimed in claim 10, wherein the potassium titanate whisker is added to the liquid crystal polymer in the molten state.

12. A process for producing a liquid crystal polymer composition as claimed in claim 10 wherein the extruder is provided with a raw material feed port for adding the liquid crystal polymer, and a separate addition port (intermediate feed port) for adding the potassium titanate whisker at an arbitrary location between said raw material feed port and an end nozzle portion.

13. A process for producing a liquid crystal polymer composition as claimed in claim 10, wherein the liquid crystal polymer and the potassium titanate whisker are kneaded at a polymer temperature within the range from that not less than the liquid crystal starting temperature of the liquid crystal polymer to that not more than a temperature higher by 40° C. than the melting point of liquid crystal polymer.

14. A process for producing a liquid crystal polymer composition comprising:
(i) continuously feeding (A) at least one liquid crystal polymer selected from the group consisting liquid crystal polyesters and liquid crystal polyesteramides capable of forming an anisotropic melt into an extruder;
(ii) melting the liquid crystal polymer (A);
(iii) continuously feeding (B) a potassium titanate whisker having a pH of 6 to 8 into melted liquid crystal polymer (A) in the extruder; and
(iv) blending 100 parts by weight of the melted liquid crystal polymer (A) and 5 to 300 parts by weight of the potassium titanate whisker (B) so that the average fiber length of potassium titanate whisker in the polymer composition is at least 4.5/μm and the melt viscosity of the polymer composition is within a range of 12 to 300 Pa·sec.

* * * * *